UNITED STATES PATENT OFFICE.

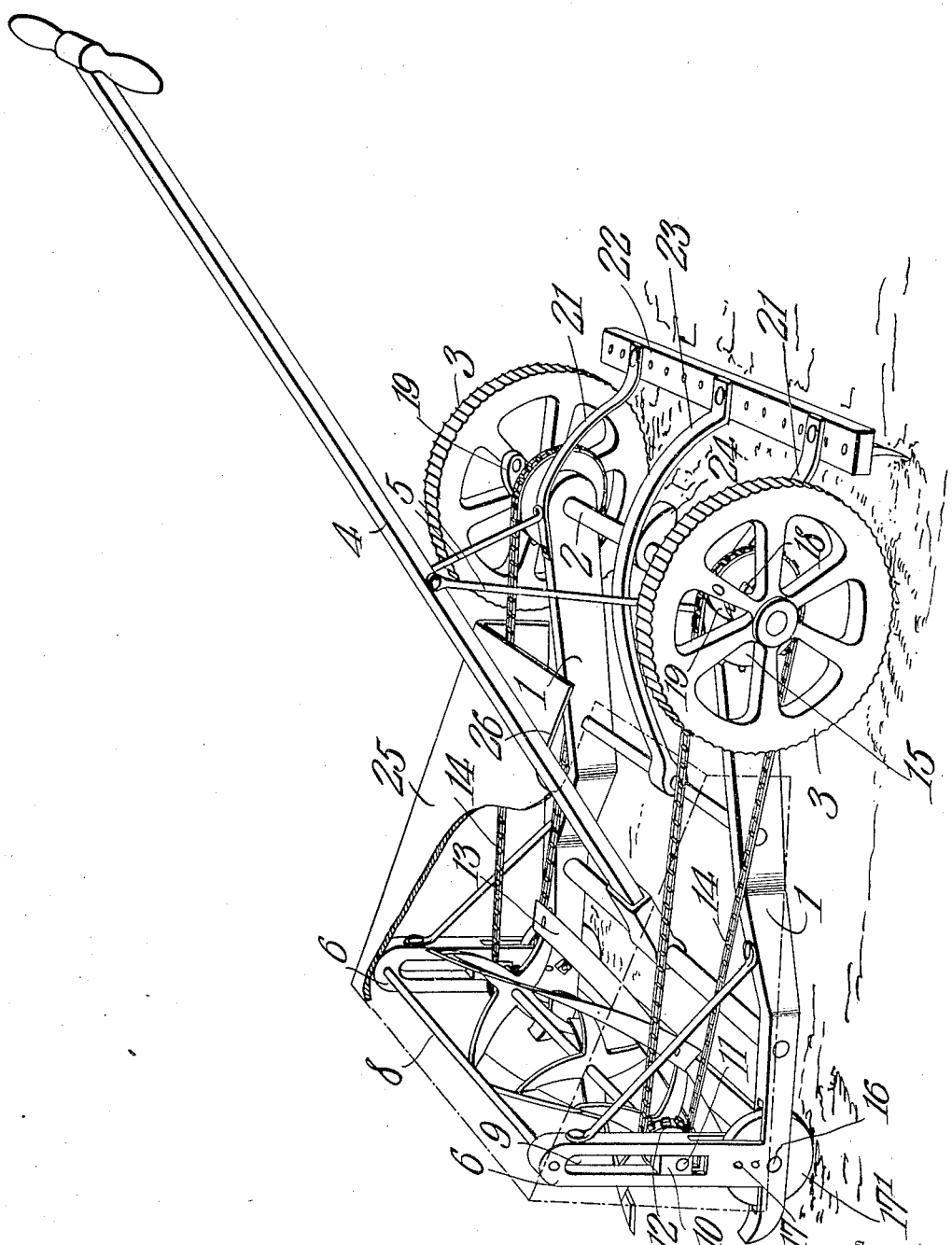

EMERY M. MITCHELL, OF ASHEVILLE, NORTH CAROLINA.

LAWN-MOWING MACHINE.

No. 892,536.  Specification of Letters Patent.  Patented July 7, 1908.

Application filed February 19, 1908. Serial No. 416,714.

*To all whom it may concern:*

Be it known that I, EMERY M. MITCHELL, a citizen of the United States, residing at Asheville, in the county of Buncombe and State of North Carolina, have invented a new and useful Lawn-Mowing Machine, of which the following is a specification.

This invention has relation to rake attachments for lawn mowers and it consists in the novel construction and arrangement of its parts as hereinafter shown and described.

The object of the invention is to provide a lawn mower with a rake attachment and means mounted upon the lawn mower for moving the rake at predetermined intervals to dumping position. By such an arrangement as the mower is passed over a lawn and the grass growing thereon is cut it is collected by the rake and at intervals, as above intimated, it is dumped in piles or windrows as desired. The operation of the rake is automatic and it is actuated through the same instrumentalities that operate the cutting blade of the lawn mower.

In the accompanying drawing the figure is a perspective view of a lawn mower equipped with my rake attachment.

The lawn mower consists of the side arms 1 which are mounted at their rear ends upon the axle 2. The said axle is supported by the ground wheels 3. The handle bar 4 is pivotally connected at its forward end to the arms 1 and is braced upon the axle 2 at intermediate points by the standards 5. The uprights 6 are mounted upon the forward ends of the arms 1 and are connected together by the rod 8. The said uprights are provided with vertically disposed elongated slots 9. The journal boxes 10 are mounted in the slots 9 and the cutter shaft 11 is journaled for rotation in the said boxes. The sprocket wheels 12 are mounted upon the shaft 11 of the cutter and the cutting blades 13 are also mounted upon the shaft of the said cutter. The chains 14 pass around the sprocket wheels 12 and the sprocket wheels 15 mounted upon the axle 2. The uprights 6 are provided with openings 17 in which the journal pins 16 of the front wheels 17' may be vertically adjusted to support the forward ends of the arms 1. The wheels 18 are mounted upon the axle 2 and are engaged by the pawls 19 mounted upon the ground wheels 3. The said pawls 19 are so disposed as to engage the ratchets of the wheels 18 when the ground wheel 3 moves forward but when the said ground wheels 3 move in a rearward direction the said pawls escape the ratchet whereby the axle 2 is not turned in a backward direction. The intermediate portions of the arms 1 are connected together by a cross rod 12.

The spring arms 21 extend rearwardly from the arms 1 and are attached at their rear ends to the rake 22. The arm 23 is pivotally connected at its forward end with the cross rod 20 and is attached at its rear end to the intermediate portion of the head of the rake 22. A cam 24 is mounted upon the axle 2 and is located directly under the intermediate portion of the arm 23. The intermediate portion of the arm 23 is upwardly bowed as illustrated in the drawing.

The hood 25 is adapted to rest at its lower edges upon the arms 1 and is provided along its middle with an elongated opening 26 through which the handle bar 4 may turn.

From the foregoing description it is obvious that as the lawn mower is passed over the surface of the ground rotary movement will be transmitted from the axle 2 through the chains 14 to the cutter shaft 11 and that the cutting blade will operate upon the standing vegetation. As the grass is cut it falls between the arms 1 and is caught up by the rake 22. At each revolution of the shaft 2 the cam 24 comes in contact with the intermediate portion of the arm 23 and lifts the said arm against the tension of the spring arm 21. As the rear ends of the arm 23 is elevated the rake 22 is carried up and the grass which has been previously collected against the said rake is permitted to escape therefrom and remain upon the surface of the ground in a pile or windrow. When the cam 24 has passed beyond its path of contact with the arm 23 the said arm 23 and the rake 22 descend under the tension of the spring arms 21.

Having described my invention, what I claim as new and desire to secure by Letters Patent is:—

1. In combination with a mower having a cutter and means for actuating the same, a spring supported rake attached to the mower and means carried by the mower for moving the rake into dumping position against the tension of the spring at regular intervals.

2. In combination with a mower having a cutter and means for actuating the same, a revolving cam mounted upon the mower, arms attached to the mower, a rake attached to said arms, an arm pivotally connected with the frame of the mower at one end and with the rake at the other end and having its intermediate portion lying in the path of movement of the cam.

In testimony that I claim the foregoing as my own, I have hereto affixed my signature in the presence of two witnesses.

EMERY M. MITCHELL.

Witnesses:
   HOMER L. MOODY,
   ETHEL RICKMAN.